Nov. 26, 1957     G. F. BAHR     2,814,086
FISHING TACKLE CONNECTION
Filed Jan. 21, 1954
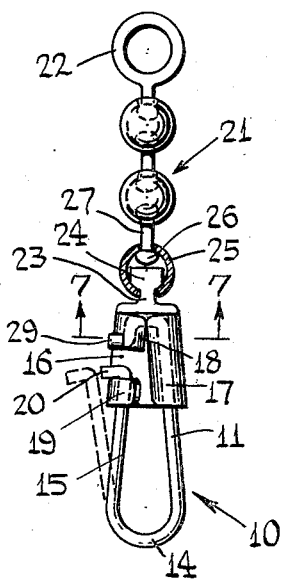
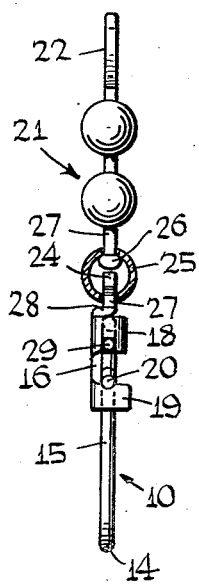
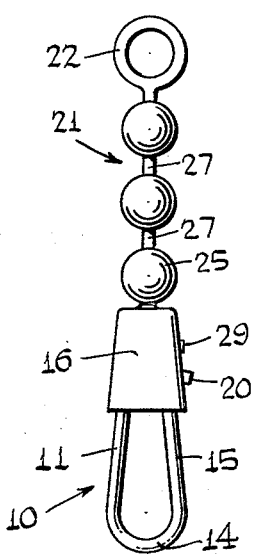
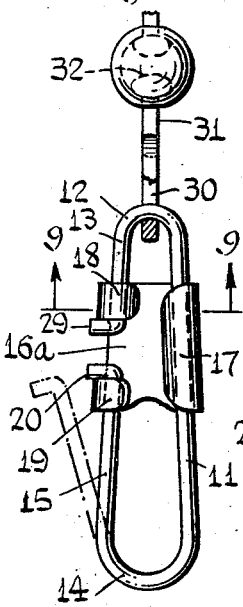
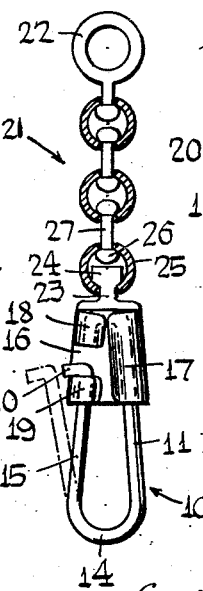
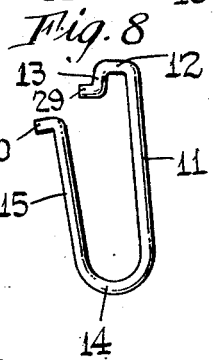
INVENTOR.
Gustave F. Bahr
BY
Johnson and Kline
ATTORNEYS

United States Patent Office 2,814,086
Patented Nov. 26, 1957

2,814,086

FISHING TACKLE CONNECTION

Gustave F. Bahr, Fairfield, Conn., assignor to The Bead Chain Manufacturing Company, Bridgeport, Conn., a corporation of Connecticut Application January 21, 1954, Serial No. 405,291

1 Claim. (Cl. 24—236)

This invention relates to swivel snap hook units such as are used in connecting a leader of a baited hook or lure or other fishing appliance to a fishing line.

The type of snap hook to which the present invention relates includes a spring wire bent to have an upper and lower loop, the standing part and leg of the upper loop portion being clinched to a yoke plate, and the leg of the lower loop portion being biased to spring clear of the yoke plate to receive the looped end of a fishing appliance. The leg is manually sprung inwardly into position to be caught by a keeper ear on the yoke plate. The upper end of the unit including the yoke plate and spring wire unit is connected by a swiveling connection to a fishing line.

Heretofore, in order to avoid the free or latch leg of the spring wire from being pulled longitudinally from under the keeper ear, the lower loop was so formed that its load receiving portion was substantially in line with the standing part of the wire, which thus received substantially all the load. The load being thus offset laterally from the longitudinal axis of the unit, caused the unit to wobble in use rather than to rotate on its axis.

A feature of the present invention is the provision of a snap hook in which the lower loop may be so formed that the load is applied substantially on the longitudinal axis of the unit so that it is distributed between the standing part of the spring wire and the free or latch leg thereof. This is accomplished by providing on the end of the latch leg a laterally bent hook portion positioned to overlie the upper edge of the keeper ear when the latch leg is in latched position and prevent the latch leg from being withdrawn longitudinally from the keeper ear. As a result of this improvement, it is possible to make the unit with wire of much smaller diameter and with less stiffness than was heretofore possible, and this in turn permits the manufacture of snap hook units of extremely small dimensions.

Another feature of the present invention is the provision on the yoke plate of a headed lug rotatably contained within the end ball of a ball-type chain forming the swivel connection between the spring and yoke plate unit and the fishing line.

A further feature of this invention is the provision of means whereby distortion of the yoke plate tending to loosen its grip on the wire is avoided, thus permitting the yoke plate to be made of much lighter gauge metal and of much smaller size. This is accomplished by providing on the end of the leg of the upper loop a laterally offset hook portion which engages the underside of the ear which clinches it to the yoke plate. Thus, loads applied to the yoke plate by the hook-shaped end of the latch leg are transmitted in a substantially straight line by the keeper ear to the leg of the upper loop through the ear which clinches it to the yoke plate.

Other features and advantages will hereinafter appear.

In the accompanying drawings which illustrate several embodiments of this invention:

Figure 1 is a side elevation partly in section showing the swivel snap hook of the present invention in which the legs of both loops opposite the standing part of the wire have laterally bent hook portions and the yoke plate has a headed lug confined within the terminal spherical member of a ball chain.

Fig. 2 is an edge view of the device shown in Fig. 1.

Fig. 3 is a view similar to Fig. 1 but showing the opposite side of the device.

Fig. 4 is a side view of a snap hook unit made according to the present invention showing part of the swivel connection, the upper loop in this form being directly connected to the swivel connection.

Fig. 5 shows the spring wire used in the device shown in Fig. 4 before it is attached to the yoke plate.

Fig. 6 shows a form of this invention which is like that shown in Fig. 1, except that the leg of the upper loop does not have the laterally extending hook portion.

Fig. 7 is a sectional view taken on line 7—7 of Fig. 1.

Fig. 8 shows the spring wire used in the form of the invention illustrated in Fig. 6 before it is assembled with the hook plate.

Fig. 9 is a sectional view taken on the line 9—9 of Fig. 4.

To simplify the explanation and understanding of the construction of the device of the present invention, the parts will be described in reference to their positions in the drawing, the swivel snap hook device being considered as hanging pendant from a fishing line. Thus it will be understood that the terms "upper" and "lower," etc. are relative and are used for the convenience of explanation only and not in a limiting sense, both in the specification and in the appended claims.

As shown in the accompanying drawing, the swivel snap hook of the present invention comprises a spring wire 10 having a standing part 11, and a U-bend or loop 12 at its upper end having a downwardly extending leg 13. At its lower end the wire 10 has a U-bend or loop 14 having an upwardly extending leg 15, which is formed to resiliently stand out, as shown in Figs. 5 and 8, in a divergent position in reference to the standing part 11.

The wire 10 is straddled by a substantially flat sheet metal yoke plate 16 having a lateral edge 17 rolled around and clinched to the standing part 11 of the wire, and at its opposite edge an ear 18 rolled around and clinched to the depending leg 13 of the upper loop 12. The edge 17 and the ear 18 securely fasten the yoke plate to the wire. The upward extending leg 15 is left free for resilient movement away from the standing part 11 and the yoke plate 16 where it may receive over its end a looped member on a leader, lure or other part of fishing gear to impale the same. When this has been done the leg 15 may be pressed manually toward the yoke plate, to be caught or latched back of a keeper ear 19 on the yoke plate, which thus closes the lower loop 14 against the removal of the fishing gear. The leg 15 thus serves as a latch.

Heretofore, the lower loop of such snap hooks has been shaped to have a more or less triangular form with the apex of the triangle, that is, the lowermost or load-receiving part of the loop, close to the standing part, so that the load imparted to the snap hook by the loop on the fishing gear was applied almost entirely to the standing part. But, the strain on the loop being thus off-center, causes the snap hook to wobble rather than rotate freely on its longitudinal axis when being drawn through the water as in trolling.

However, according to the present invention, the lower loop may be so formed that its load-receiving point may be on or close to the longitudinal axis of the device. For instance, the lower loop 14 may be substantially semicircular as shown in the drawings. This would apply part of the load to the standing part 11 and part to the latch leg 15, which would tend under a heavy load to pull the latch leg longitudinally from under the keeper ear 19. According to the present invention, this is avoided by forming the leg 15 so that its end is bent laterally to form a hook 20 which is so positioned relative to the keeper ear 19 as to engage the upper edge thereof when load is applied to the latch leg and thus prevent the latter from pulling out longitudinally from under the keeper ear.

The latch leg 15 thus being positively prevented from escaping from under the latch leg, it is possible to use lighter gauge wire to form the snap hook and this in turn makes it possible to make the snap hooks in very small sizes. For instance, a swivel snap hook constructed as shown in Fig. 6, having a length from the center of the ring which receives the fishing line to the bottom of the loop 14 of approximately 25/32 of an inch, has been successfully manufactured and used, the wire being .019 of an inch in diameter and measuring from loop to loop 23/64 of an inch.

To connect the fishing line to the snap hook so that it may freely swivel, the wire 10 is connected to a ball chain 21 terminating in a loop member 22 to which the fishing line is attached.

As shown in Figs. 1-3 and 6, this is accomplished in a most economical and advantageous manner by making the yoke plate 16 so that it has at its upper edge a lug 23 provided with an enlarged head 24 shaped to fit in a hollow spherical member 25 for free rotation which may, and preferably is, the lower or terminal ball of the ball chain 21. The hollow sphere 25 encloses both the head 24 of the lug 23 and a head 26 of the adjacent dumbbell unit 27 forming part of the chain when swaged to shape in the manner of making ball-type chains. The upper end of the yoke plate has an offset bend 28, see Fig. 2, so as to position the wire 10 in alignment with the axis of the sphere 25.

To transmit strain applied to the yoke plate 16 through the ball chain to the fishing line, the edge 17 and the ear 18 of the yoke plate is firmly clinched around the standing part 11 and the leg 13 of the wire as shown in Figs. 7 and 9, and this is sufficient if the metal of the yoke plate is heavy and stiff enough.

However, in some situations it is advantageous to provide the depending leg 13 of the upper loop 12 with a laterally extending portion forming a hook 29 which is positioned to engage the bottom edge of the ear 18 as shown in Figs. 1 and 4 so that the hook 29 receives any strain, applied to the yoke plate by the wire 10 under load, which would tend to cause distortion of the yoke plate or cause it to shift its position relative to the wire.

This is particularly advantageous with the type of snap hook shown in Fig. 4 in which the yoke plate 16a does not engage the upper loop 12 of the wire as in the forms shown in Figs. 1 and 6, but is located somewhat below the loop 12. In this construction the loop 12 is connected independently of the yoke to the ball chain or other swivel-type connection leading to the fishing line. As shown in Fig. 4, the upper loop 12 passes through an eye 30 in a member 31 having at its upper end a head 32 confined in a terminal spherical member of the ball chain. Thus it will be seen that in the construction shown in Figs. 1 and 4, the strain of the load received by the lower loop 14 is transmitted to the upper loop 12 by the material of the yoke plate between the ears 18 and 19 which thus acts as a coupler and resists the longitudinal separation of both the legs 13 and 15 under load.

In assembling the snap hook shown in Fig. 4, the leg 13 is passed through the opening 30 of the member 31 before the wire is positioned on the yoke and clinched thereby.

As seen in Fig. 4, the keeper ear 19 is narrow and is slightly greater in length than the diameter of the latch leg 15 and is spaced from the edge of the portion 17 and the lower edge of the upper ear a distance substantially greater than the diameter of the latch leg 15. The size and spacing of the portions 17, 18 and 19 permit the latch leg 15 to be quickly and easily inserted into latched relation with the lower ear 19 without interference by the upper ear 18 or the portion 17 of yoke 16a.

Where the clinching of the wire by the yoke is sufficient, the gauge of the material used and the possible loads being taken into consideration, the hook on the end of the leg 13 may be omitted as shown in Fig. 6.

Variations and modifications may be made within the scope of the claim and portions of the improvements may be used without others.

I claim:

In a fishing tackle having a snap hook unit comprising a spring wire formed to have a standing part; U-bends at each end of the standing part forming upper and lower loops respectively with the upper loop having a downwardly extending leg and the lower loop having an upwardly extending, outwardly sprung latch leg; a yoke plate having an edge portion clinched over the standing part of the wire; an upper ear projecting from the opposite edge portion and clinched over the downwardly extending leg of the upper loop, and a keeper ear projecting from the opposite edge portion of the plate and spaced below said upper ear, said keeper ear releasably holding the latch leg when the latter is sprung behind it to retain fishing equipment threaded onto said latch leg; and swivel means for connecting the unit to a fishing line: the improvement wherein the lower loop has its load-receiving point substantially on the vertical medial line of the unit whereby the load is distributed between the latch leg and the standing part, the downwardly extending leg of the upper loop is provided with a lateral projection extending under the lower edge of the upper ear to receive strain on the yoke and prevent distortion thereof under load, the keeper ear is narrow and of a length slightly greater than the diameter of the wire and is spaced from the upper ear and the edge of the portion clinched about the standing part of the wire a distance substantially greater than the diameter of the wire, and the latch leg has a laterally extending end portion overlying the keeper ear at the upper edge thereof to prevent the latch leg from being pulled longitudinally free from the narrow keeper ear when load is applied to the lower loop of the wire, the space between the keeper ear and the upper ear and edge portion clinched about the standing part facilitating freedom of movement of the latch portion having the laterally extending end portion into latched relation with the keeper ear.

References Cited in the file of this patent

UNITED STATES PATENTS

| 731,023 | Cooper | June 6, 1903 |
| 755,970 | Welles | Mar. 29, 1904 |
| 794,979 | Haverly | July 18, 1905 |
| 1,623,302 | Buffington | Apr. 5, 1927 |
| 1,742,915 | Ingersoll | Jan. 7, 1930 |
| 2,198,092 | Schor et al. | Apr. 23, 1940 |
| 2,219,983 | Evenson | Oct. 29, 1940 |
| 2,595,700 | Plough | May 6, 1952 |
| 2,676,380 | Lindquist et al. | Apr. 27, 1954 |

FOREIGN PATENTS

| 433,433 | France | Oct. 26, 1911 |